Feb. 5, 1952 — J. OKUN — 2,584,732
ADJUSTABLE ARMREST
Filed Oct. 6, 1949
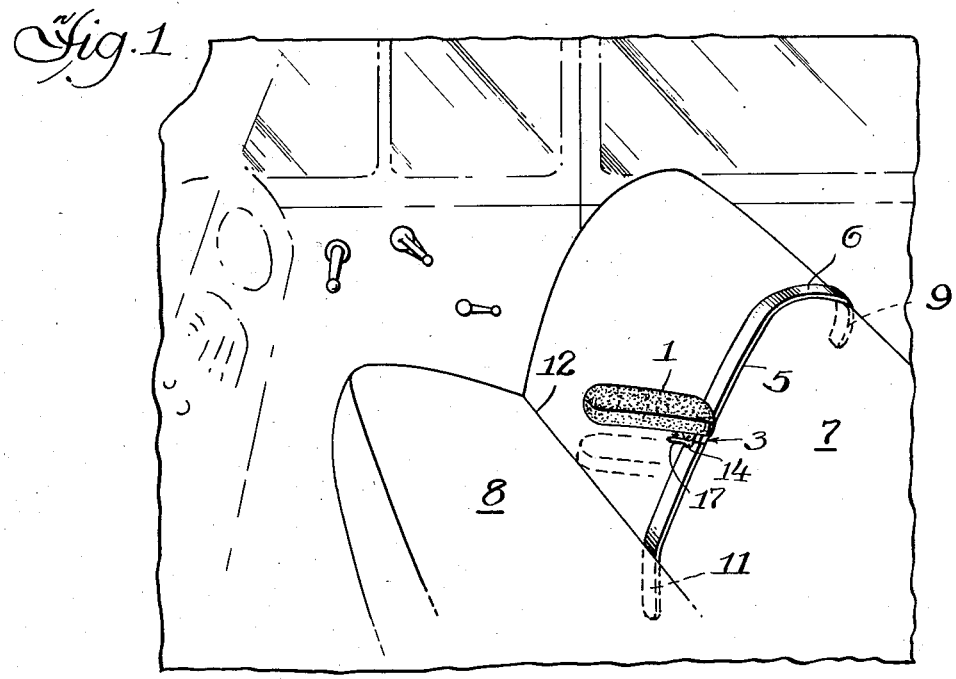
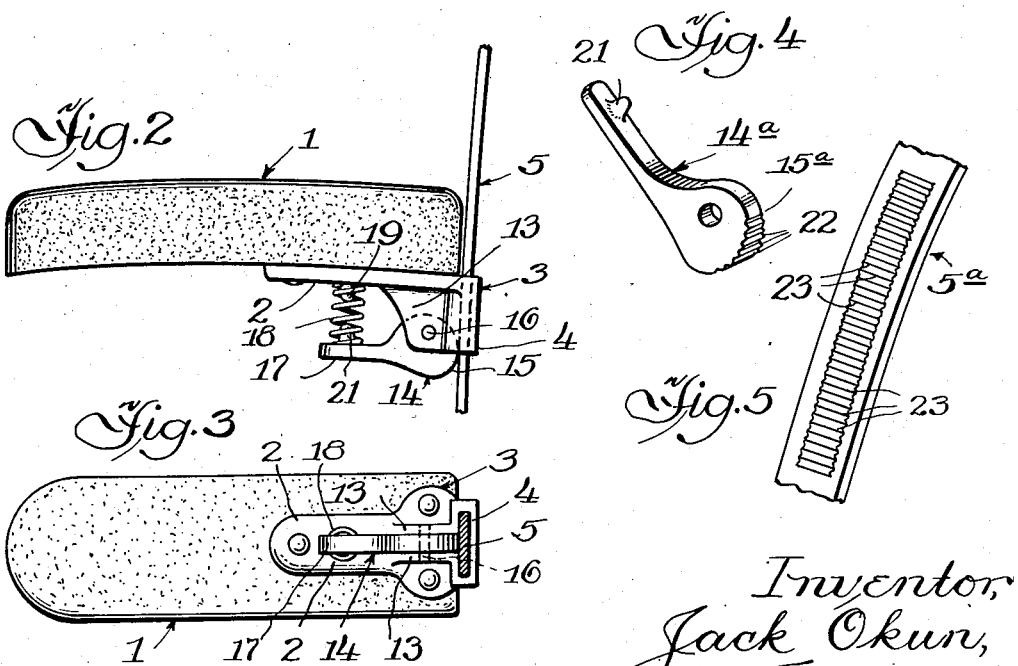
Inventor,
Jack Okun, Patented Feb. 5, 1952

2,584,732

UNITED STATES PATENT OFFICE 2,584,732

ADJUSTABLE ARMREST

Jack Okun, Chicago, Ill., assignor of one-half to Joseph Velick, Chicago, Ill.

Application October 6, 1949, Serial No. 119,828

4 Claims. (Cl. 155—112)

1

The present invention relates to an adjustable arm rest and especially to a novel arm rest assembly for supporting the right arm of the operator or chauffeur of an automobile.

Automobiles of recent design and construction generally provide an arm rest mounted on the interior of the front door adjacent the operator for resting thereon the left arm of the operator. However, no provision is made for providing an arm rest for the right arm of the operator, and because of the differences in the physical characteristics including height, weight, etc. of the various persons who may operate or drive such automobile, an arm rest to be satisfactory must be fully adjustable both laterally or lengthwise of the front seat as well as vertically to allow for such variations in physical characteristics.

The present invention obviates the above difficulties in that the novel arm rest is adjustable lengthwise of the front seat to accommodate persons of different width, and is also adjustable vertically to accommodate persons of different height. It is, therefore, an important object of the present invention to provide a novel arm rest for supporting the right arm of the operator of an automobile which is readily adjustable vertically and laterally whereby any operator regardless of his physical characteristics, may quickly adjust and maintain the arm rest in a position to fully satisfy his own requirements.

A further object of the present invention is to provide a novel arm rest that is not only bodily movable and adjustable to a desired position, but may be quickly assembled on or removed from the front seat, as desired or required.

The invention further comprehends the provision of an arm rest having novel locking mechanism for facilitating adjustment and locking of the arm rest in a desired adjusted position for one operator, but permitting quick release and minute and accurate adjustment by another operator when taking the wheel of the automobile. When once adjusted, the arm rest will remain in that adjusted position until manually released. Any excess pressure applied to the arm rest has no tendency to cause it to release, but rather forces it into tighter engagement by reason of the camming action of the locking means.

Further objects of the invention are to provide a construction of maximum simplicity, efficiency, economy and ease of assembly and operation, and such further objects, advantages and capabilities as will later more fully appear and are inherently possessed thereby.

The invention further resides in the construc-

2 tion, combination and arrangement of parts illustrated in the accompanying drawing, and while there is shown therein a preferred embodiment, it is to be understood that the same is susceptable of modification and change, and comprehends other details, arrangements of parts, features and constructions without departing from the spirit of the invention.

In the drawing:

Figure 1 is a fragmentary view in perspective showing the front seat of an automobile with the novel adjustable arm rest mounted in position.

Fig. 2 is a view in side elevation of the novel adjustable arm rest, the upright support or metal strap being broken away at the top and bottom thereof.

Fig. 3 is a bottom plan view of the adjustable arm rest of Fig. 2.

Fig. 4 is a view in perspective of an alternate form of adjustable arm latch or locking member.

Fig. 5 is a fragmentary view in perspective of an alternate form of upright support or metal strap provided with serrations in which the serrated edge or teeth of the latch or locking member of Fig. 4 engage.

Referring more particularly to the novel illustrative embodiment shown in Figs. 1, 2 and 3, there is disclosed an adjustable arm rest 1 mounted at its inner end upon an arm 2 of an adjustable bracket 3 by screws or other attaching means, and the bracket provided with a slotted rear end 4. This slot is adapted to receive and permit relative movement between the bracket 3 and a supporting bar or metal strap 5 whereby the bracket and arm rest are vertically adjustable upon the bar.

The supporting bar or strap 5 is bent or formed adjacent its upper end 6 to closely conform to the contour of the rear or back 7 of the front seat 8 and with the extreme upper end 9 bent downwardly thereover to prevent unintentional disengagement. The lower end 11 of the supporting bar or strap is bent rearwardly to be received between the rear edge 12 of the front seat 8 and the rear or back 7 of this seat. Generally it is preferable to locate this bar or strap approximately four to six inches to one side of the operator, and due to the differences in the physical characteristics of those who may operate the automobile, this bar or strap is made so that it may be quickly removed and replaced sideways, toward and away from the operator. However, when mounted in the desired position, the supporting bar remains in that position until removed.

As shown in Figs. 1, 2 and 3, the supporting bar or strap 5 is relatively smooth and in order to latch or lock the arm rest 1 onto this bar, the bracket 3 is provided with spaced depending lugs 13 adapted to receive therebetween a latch member 14 having at one end an eccentric cam face 15 pivotally mounted upon a cross-pin 16, and at its other end a trigger 17 spring-pressed or biased to lowered, locking position by a coil spring 18 held in position by a projection 19 depending from the underside of the bracket arm 2 and a similar projection 21 upstanding on the upper surface of the trigger 17.

From the above it will be seen that the arm rest may be adjusted not only laterally by bodily moving the strap or supporting bar 5, but also vertically by moving the trigger upwardly against the spring whereby to release the latch member 14 from clamping engagement with the bar or strap 5. Upon releasing the latch after the arm is moved to the vertically adjusted position, the spring automatically moves the latch to locked position and regardless of the downward pressure applied to the arm rest there is no danger of its being released because of the camming action of the latch.

Figs. 4 and 5 show a slightly modified construction of latch member 14ª in which the eccentric cam face 15ª is serrated or provided with teeth 22, and the supporting bar or strap 5ª is provided with complementary serrations or teeth 23 adapted to receive the serrations or teeth 22 on the cam face and provide a positive interlock therebetween. In other respects the latch assembly and strap are similar to the disclosure in Figs. 1, 2 and 3.

From the above description and the disclosure in the drawing, it will be evident that the present invention comprehends a novel adjustable arm rest for supporting the right arm of the operator of an automobile.

Having thus disclosed the invention, I claim:

1. An adjustable arm rest for the front seat of an automobile and providing a support for the right arm of the operator, comprising a supporting bar formed of a relatively wide and flat metal stock bent to conform to the back of the front seat with the upper end extending over and thereby anchored upon the upper portion of the back for retaining this end in fixed position and with the lower end bent rearwardly and this bent end received and held between the rear of the front seat cushion and the back, an arm rest vertically adjustable upon the supporting bar and including a supporting bracket having a slot therethrough for receiving therein the supporting bar and a spring-pressed latch member having an eccentric face pressed into and held in tight engagement with the adjacent surface on the supporting bar whereby to retain the arm rest rigidly in any desired adjusted position.

2. An adjustable arm rest for the front seat of an automobile and providing a support for the right arm of the operator, comprising a supporting bar anchored upon and conforming to the contour of the rear cushion of the front seat and having its lower end projecting downwardly and anchored between the base of the rear cushion and the front seat cushion, and an arm rest vertically adjustable upon the supporting bar and including a supporting bracket having a vertical slot for slidably receiving therein the supporting bar and a spring-pressed latch member having an eccentric surface forced into locking engagement with the adjacent surface on the supporting bar whereby to retain the arm rest in any desired adjusted position.

3. An adjustable arm rest for the front seat of an automobile and providing a support for the right arm of the operator, comprising a relatively wide and flat metal bar anchored upon and conforming to the contour of the rear cushion of the front seat and having one end extending up and over the rear cushion and the other end extending downwardly and anchored between the base of the rear cushion and the front seat cushion, said supporting bar being bodily removable and replaceable along the rear cushion whereby to accommodate persons of different physical characteristics, and an arm rest vertically adjustable upon the supporting bar and including a supporting bracket having a vertical slot for slidably receiving the supporting bar and a spring-pressed latch member having an eccentric surface forced into locking engagement with the adjacent surface on the supporting bar and retaining the arm rest in any adjusted position by the spring and the camming action of the eccentric surface.

4. An adjustable arm rest for the front seat of an automobile and providing a support for the right arm of the operator, comprising a supporting bar anchored upon and closely conforming to the contour of the rear cushion of the front seat, a serrated portion on the supporting bar, and an arm rest slidable and vertically adjustable on the supporting bar and provided with a vertically slotted bracket having a pivotally mounted eccentric latch having a serrated eccentric surface adapted to engage the serrations on the supporting bar and spring-biased to locking position with the bar whereby to retain the arm rest in any desired vertical position of adjustment, and a trigger for compressing the spring and releasing the serrated latch from the serrated portion of the supporting bar.

JACK OKUN.

REFERENCES CITED

The following references are of record in the file of this patent:

UNITED STATES PATENTS

| Number | Name | Date |
|---|---|---|
| 312,938 | Walter | Feb. 24, 1885 |
| 420,366 | Van Horn | Jan. 28, 1890 |
| 518,771 | Archer | Apr. 24, 1894 |
| 576,547 | Campbell | Feb. 9, 1897 |
| 1,076,588 | Lemirand | Oct. 21, 1913 |
| 1,264,837 | Moen | Apr. 30, 1918 |
| 1,463,293 | Paddock | July 31, 1923 |
| 1,742,822 | Olson | Jan. 7, 1930 |